J. F. Moore,
Horse Power.
Nº 2,073.  Patented May 4, 1841.
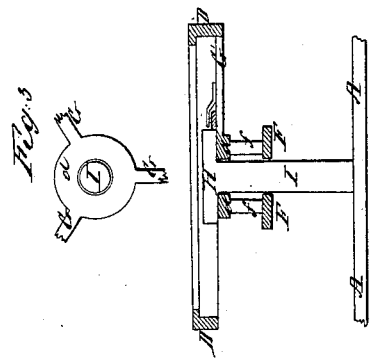
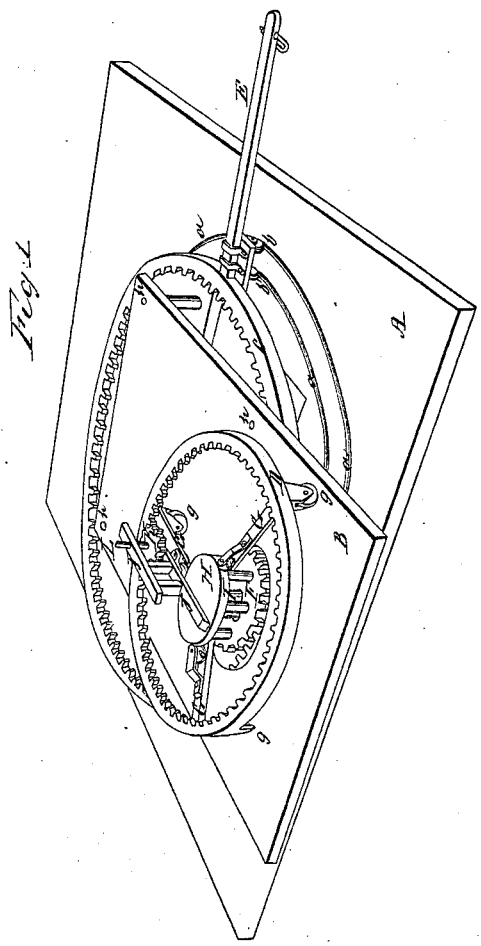

UNITED STATES PATENT OFFICE.

J. FRANCIS MOORE, OF FALMOUTH, VIRGINIA.

MANNER OF CONSTRUCTING MACHINES FOR APPLYING ANIMAL OR OTHER POWER TO THE PROPELLING OF MACHINERY.

Specification of Letters Patent No. 2,073, dated May 4, 1841.

*To all whom it may concern:*

Be it known that I, J. FRANCIS MOORE, of Falmouth, in the county of Stafford and State of Virginia, have invented an improvement in the manner of constructing propelling-machines, which is intended for the applying of animal or other motive power to the propelling of threshing-machines, mills for grinding, and other machinery; and I do hereby declare that the following is a full and exact description thereof.

The accompanying drawing is a representation of my propelling machine in perspective; and it is shown as furnished with a lever, or sweep, by which a horse, or horses, may be attached to it. It has two platforms, A, and B, upon which the two main wheels C, and D, are sustained by means of wheels, or of rollers, attached to their under sides, and running on said platforms. Each of the principal, or main, wheels has cogs on the interior of its rim, serving to drive two lesser cog-wheels, or pinions, in a way to be presently described. The main wheels C, and D, have no gudgeons, or pivots, at their centers, but have their entire vertical bearings on the above named platforms, by means of the friction rollers, or wheels. The lower platform A, has on it a circular rail way; a, a, being two circular rails, to which the wheels b, b, are adapted, their axle running in the truck frame c, which is made fast to the under side of the wheel C; there are three such truck frames, and pairs of wheels, the faces or peripheries, of these wheels being grooved to receive the rails, thus serving to keep the wheel C, in place, which, as before remarked, consists of a circular rim, without spokes.

E, is a lever, or sweep, to which a horse, or horses, may be attached.

F, is a cog-wheel which gears into the cogs of the wheel C, and thus drives the wheel D, to which the wheel F, is attached. The wheel D, has three arms extending from its rim to a hollow center piece d, Figures 2, and 3; Fig. 2, being a vertical section through the center of the cap piece H, and a stationary shaft by which it is supported.

I, is this shaft, the lower end of which is made fast to the lower platform A, and on its upper end is firmly fixed the circular cap piece H. The arms G, G, carry friction wheels e, e, which bear against the periphery of the cap piece H, and serve to keep the wheels D, and F, in place, without the necessity of axles, or gudgeons. The wheel F, is fastened to the center piece d, of the wheel D, by means of the small pillars f, f, f, which are tenoned into each of them, thus forming a kind of lantern, which passes over, but does not touch the shaft I. The wheel D, is sustained upon the platform B, by three truck, or friction, rollers g, g.

A frame J, J, is made fast upon the stationary cap piece H, and this frame has a small cog-wheel K, running in bearings at its outer end, in such manner as to gear into the teeth of the wheel D, which as it revolves will consequently give motion to the small cog-wheel K, and its shaft L; from this shaft motion may be communicated to any machinery to be driven, by means adapted thereto.

The platform B, is sustained in its place above the platform A, by four vertical posts h, h, extending from one to the other, within the wheel, or rim, C. The wheel b', of the rail-way truck, should be made smaller than the wheel b, that they may operate as a rolling frustum of a cone, otherwise it would be necessary to leave one of these wheels loose on its axis, which would still produce more friction than is produced when the wheels are properly graduated in size. The respective parts of my machine may vary in size, and will, of course, be made to do so, according to the power which is to be applied and the velocity which is to be obtained. This is a matter of calculation sufficiently well understood by every competent machinist. I believe, however, that for ordinary purposes, the wheel C, may be twelve feet in diameter, the wheel D, seven feet, the wheel F, two feet, and the wheel K, eight inches, all of which dimensions may be varied, without altering the principle of construction, or of action.

Having thus fully described the nature of my machine, and shown the manner of its construction, and mode of operation, what I claim therein as new, and desire to secure by Letters Patent, is—

1. The manner in which I have combined and arranged the respective parts thereof as set forth; that is to say, I claim the combination of the two wheels C, and D, with the two platforms A, and B, and with each other, in such manner as that said wheels shall be supported on their respective platforms by truck, or friction, wheels, and revolve thereon without the aid of axles, or gudgeons.

2. I claim, also, the particular arrangement and combination of the four wheels, in the manner set forth; the two larger wheels having their cogs, or teeth, on the interior of their rims, and meshing into, or engaging with, the two smaller, by an arrangement of the respective parts substantially the same with herein described.

J. FRANCIS MOORE.

Witnesses:
    THOS. P. JONES,
    J. MOORE.